United States Patent [19]

Alagy et al.

[11] Patent Number: 5,186,910
[45] Date of Patent: Feb. 16, 1993

[54] METHOD AND REACTOR FOR OXIDATION WITH A PRESSURE DROP DIFFERENTIAL, AND ITS USE

[75] Inventors: Jacques Alagy, Charbonnieres; Paul Broutin, Ecully; Christian Busson, Dardilly; Yves Gougne, Givors; Jerome Weill, Lyons, all of France

[73] Assignee: Institut Francais du Petrole, Rueil Malmaison Cedex, France

[21] Appl. No.: 582,426

[22] Filed: Sep. 12, 1990

[30] Foreign Application Priority Data

| Sep. 12, 1989 | [FR] | France | 89 12016 |
| Jun. 21, 1990 | [FR] | France | 90 07915 |
| Jun. 21, 1990 | [FR] | France | 90 07914 |
| Jun. 21, 1990 | [FR] | France | 90 07913 |

[51] Int. Cl.$^5$ .............................................. B01J 8/02
[52] U.S. Cl. ................................... 422/220; 422/177; 422/180; 422/216; 422/222; 422/241; 422/242
[58] Field of Search ............... 422/177, 211, 181, 180, 422/222, 220, 216; 48/127.9

[56] References Cited

U.S. PATENT DOCUMENTS

| 1,722,339 | 10/1926 | Pauling | 422/222 |
| 2,279,153 | 4/1942 | Wilcox | 422/211 |
| 2,621,117 | 12/1952 | Garrison | 48/DIG. 4 |
| 2,980,515 | 3/1958 | Horner et al. | 422/220 |
| 4,728,503 | 3/1988 | Iida et al. | 422/177 |
| 4,857,089 | 8/1989 | Kitagawa et al. | 422/180 |
| 4,957,710 | 9/1990 | Nagai et al. | 422/211 |
| 4,971,770 | 11/1990 | Alagy et al. | 422/191 |
| 5,037,619 | 8/1991 | Alagy et al. | 422/191 |

*Primary Examiner*—Jill A. Johnston
*Assistant Examiner*—Long Le
*Attorney, Agent, or Firm*—Antonelli, Terry Stout & Kraus

[57] ABSTRACT

An oxidation reactor having elongated shape includes in combination, a mixing member including a pipe for feeding oxidizing gas and a pipe for feeding oxidizable charge; a reaction member, arranged subjacent the mixing member, and a discharge member associated with a discharge pipe for the products of the reaction. The reaction member includes a central zone which has a first lining and the reactor includes at least one peripheral zone which has a second lining, passages in the second lining being smaller than passages in the first lining so that the pressure loss in the second lining is greater than that of the first lining. The second lining forms a sleeve surround the first lining and this sleeve is formed of at least one refractory heat insulating material. The oxidation reactor is provided with an external sleeve steel jacket, a concrete wall and a steel element surrounding the mixing member arranged above the reaction member. The reaction member includes a series of single elements which form juxtaposed channels.

30 Claims, 4 Drawing Sheets

METHOD AND REACTOR FOR OXIDATION WITH A PRESSURE DROP DIFFERENTIAL, AND ITS USE

BACKGROUND OF THE INVENTION

The invention concerns a reactor and its use, for example for carrying the controlled oxidation reaction of an oxidizable charge by an oxidizing gas or a mixture of gases containing at least one oxidizing gas, that is to say, a gas permitting oxidation of said charge.

The invention applies more particularly to oxidation, preferably slow and usually partial oxidation, of oxidizable charges such as hydrocarbons, with a view to the preparation of synthesising gas essentially comprising carbon monoxide and hydrogen, for synthesis e.g. of methanol and/or higher homologous alcohols, and ammonia.

Although the oxidizing gases may in particular be oxygen, ozone or halogens, only oxidation reactions with oxygen will be considered, as examples, in this specification.

It is known to carry out partial oxidation of methane as indicated, for example, in U.S. Pat. No. 2,621,117.

According to the specification of that U.S. patent, the reaction takes place in a flame where the gases are never perfectly mixed. Under these conditions high temperatures are reached rapidly in the zones rich in oxygen. The high temperature gases are then mixed with most of the hydrocarbon charge to be oxidized, and cause cracking of molecules and carbon formation, which is very troublesome for the remainder of the process. If it is important to operate under economic conditions, that is to say, particularly without having to use excess oxygen, a dust removal stage then has to be provided as taught particularly in recent U.S. Pat. No. 4,699,631, before the gases formed are used at the oxidation stage.

It is also known that oxidation reactions may be carried out using the flame pinching concept. The principle is well known and is described, e.g. in the book by G. de Soete and A. Feugier "Physical and Chemical Aspects of Combustion" Editions TECHNIP pages 87 to 93. The wall effect is used to reduce the reaction speed and avoid propagation of the flame resulting from combustion.

In processes using the flame pinching concept the presence of oxygen, which may be pure or diluted with inert gases, and the high temperature, involving a strong heat flux, make it necessary to have flame stopping means to enable the reaction to continue without explosion, although one is usually within explosive limits (particularly in the case of partial oxidation of methane).

Several recent patents or patent applications have been based on this principle. Those in Applicants' name can be cited in particular: EP-B-221813, EP-B-231706 and FR 2628727 and U.S. Pat. No. 3,467,504.

SUMMARY OF THE INVENTION

The present invention comes within the scope of this flame pinching concept and particularly concerns a considerable improvement in reactor technology.

In the technology based on the flame pinching principle, which comprises carrying out a flameless oxidation reaction, the reactor can be thought of as being divided into at least two very distinct parts, each with a well defined function.

In at least one first part, described as the mixing zone and comprising at least one mixing member or means, an attempt is made to obtain the best possible mix of the reactive gases (that is to say, of at least one oxidising gas and the oxidizable charge), e.g. of air, methane and steam.

As far as this first, gas mixing part is concerned, it is advantageous to use any type of mixer well known in the art, particularly one which meets the following criteria:
the best possible mixing of the gases which are to react together are obtained so that there is a very homogeneous mixture of oxidizable charge and oxidizing gas at the inlet to the reaction zone; and
any significant starting of the oxidation reaction is avoided in the mixing zone.

As a non-restricted example, one can use the mixing systems described in the above mentioned patent documents in Applicants' name.

The reaction is allowed to develop in at least one second part of the reactor, which is described as the reaction zone and which has at least one reaction member or means. All or part of this zone may be lined with catalyst. The invention particularly concerns the design of this second part of the reactor.

In the prior patent documents, and particularly those in Applicants' name, this second part of the reactor is designed so that the reaction can develop in a reaction zone located substantially in the center of the reactor. This zone may be surrounded directly by a layer of refractory concrete or by insulating refractory bricks forming the link between the reaction member of a central zone and the external, usually metallic casing of the reactor, by a method well known in the art when operating at high temperature and relatively high pressure. Alternatively the reaction zone may be surrounded by a sleeve of hard ceramics, for example mullite, which is itself surrounded by a layer of refractory concrete. In either case the mechanical properties, particularly of the concrete, are usually inadequate to allow very long operating periods. In long term operation tests microfissures have, in fact, been found to form, making it necessary to stop the reactor. In cases where the reactor has a hard ceramic sleeve between the reaction zone proper and the concrete layer, although the formation of microfissures in the concrete layer is generally retarded, it is relatively more difficult to prevent the reaction from starting in the mixing zone, while maintaining acceptable conditions in respect of the ratio of reactants. The difficulty is at least partly bound up with the great heat conductivity of the hard ceramic sleeve, which is relatively thick compared with the walls of the channels in a single element. This has the effect of increasing the temperature in the mixing zone, and hence it is difficult to prevent reaction from starting in the mixing zone.

The chief problems encountered in carrying out oxidation reactions, and particularly the reaction with methane, air and steam, are well known in the art. In the case of oxidation of methane, the composition of the gases and the final temperature reached in equilibrium can be calculated when one knowns the composition, the initial temperature of the reactants and the pressure at which equilibrium is reached under adiabatic conditions.

It is also well known that passage from the initial temperature, which is the temperature after mixing and before reaction, to the final temperature, as calculated in the manner indicated above, does not take place gradually; the temperature in the reaction zone passes through a maximum which is far higher than the final temperature. Reference may be made e.g. to the report by Prettre et al published in Transactions of the Faraday Society 1946, vol. 42, pages 335 to 340.

In fact several reactions are in competition in the total progress of the oxidation reaction. As soon as a fraction of the methane has been converted to carbon monoxide and hydrogen, highly exothermic and very rapid oxidation reactions take place, particularly of hydrogen to water and of carbon monoxide to carbon dioxide, and these initially consume all the available oxygen. Since the enthalpies of the two reactions are much higher than that of the controlled oxidation of methane to carbon monoxide (CO) and hydrogen ($H_2$), there is thus excess enthalpy, leading to a very great elevation of temperature. The temperature subsequently drops through the appearance of slower, endothermic reactions, such as the reaction of methane and water giving carbon monoxide and hydrogen.

These last reactions are generally described as "return to equilibrium" reactions. It should be noted that these reactions are very often encouraged by the presence of an appropriate catalyst.

In reactors of elongated shape, which are used when oxidation is carried out on the flame pinching principle, the flow of the mixture of gases can generally be classed as a piston-type flow. This implies that the temperature profile in the direction of flow from the inlet (E) of the reaction zone to the outlet (F) thereof is as shown diagrammatically in FIG. 1. It will be seen from FIG. 1 that the temperature passes through a maximum (M) which is very high and located near the inlet of the reaction zone (Curve 1).

This temperature profile, which is laid down by the thermodynamics and kinetics of the reactions taking place in the oxidation zone, makes it necessary to have a special design for the reactor, so that the inevitable disadvantages are avoided as far as possible.

Thus the materials used in the design of the reactor must be able to tolerate a steep linear temperature gradient without being even partially destroyed. They must also resist relatively high pressures, e.g. pressures up to 25 MPa.

Apart from the design of the reactor, the higher the maximum temperature in the reaction zone, the greater the heat losses will be. In order to compensate for these losses and to obtain the desired conversion, it is possible e.g. to increase the oxygen content. However, the change in the oxygen content will further raise the maximum temperature, thus making it more difficult to control the non-starting of the reaction in the mixing zone, since the partial pressures of the reactants will be higher and the temperature of the mixing zone will also be high. It might consequently be necessary to reduce the preheating of the gases prior to mixing, but this is not economically desirable.

In the reaction zone proper of the reactor, the higher the temperature, the more danger there is of coke formation. It would therefore be desirable to operate at the lowest possible temperature, so that methane cracking reactions can be avoided to the maximum. The higher the temperature, the more easily these reactions take place, and they lead to coke formation.

One of the objects of the invention is to avoid the disadvantages described above. The objectives of the present invention which solve the problems raised by prior art are essentially as follows:

to maintain the "flame stopping or pinching arrangement" so as to avoid explosion and yet allow for operation at temperatures which may be higher than 1000° C., e.g. 1200° or 1400° C., while ensuring that the reactor and mixing arrangement are protected from the excessive heat liberated during the partial oxidation;

to obtain a mechanically strong unit which can adapt to the steep heat gradients inherent in such a process and which can function continuously for several tens of hours;

to limit heat losses as far as possible, thereby keeping the reactants in a ratio such that the maximum temperature in the reaction zone is not too high;

to limit heating of the mixing zone through conduction of the heat liberated in the reaction zone.

The invention proposes a reactor which avoids most of the disadvantages of prior art. In its most general form the invention concerns an oxidation reactor of elongated shape, preferably with a substantially vertical axis, comprising in combination:

at least one mixing member or mixture including means for feeding oxidising gas and means for feeding oxidisable charge, at least one reaction member, following said mixing member and located at a distance therefrom which is no greater than the flame pinching distance, i.e. not exceeding a distance for stopping a flame which may result from reaction of the oxidizable charge and the oxidizing gas, and at least one member for discharging the products of the reaction, connected to said reaction member, characterized in that the reaction member comprises a central zone, preferably with an axis substantially identical with that of the reactor, which over at least part of its cross-section has at least one first lining, adapted to define a multiplicity of spaces providing passages which, in at least one direction, have a dimension no greater than the pinching distance of the flame which may result from oxidation of said charge, and at least one peripheral zone which, over at least part of its cross-section, has at least one second lining, adapted to define a multiplicity of spaces providing passages which, in at least one direction, have a dimension smaller than that of the passages in the central zone,
—said dimension preferably being from 2 to 1000 times smaller than that of the passages in the central zone,
—so that the pressure loss in the second lining is greater than that in the first lining, said second lining forming a sleeve surrounding said first lining, and said sleeve being formed from at least one refractory, heat insulating material. In the reactor described above, for a given flow rate of oxidisable charge and oxidising gas, the pressure loss differential between the peripheral zone and the central zone ($\Delta P_2 - \Delta P_1$) is usually at least 10 Pascals and may be up to or even over 0.5 MPa (megapascal). The differential is preferably from 100 Pascals to 0.4 MPa. The sleeve may be a single, one piece element, that is to say, an element extending over the whole length of the reaction zone, or even over the whole length of the mixing zone and the reaction zone; it may equally be divided into at least two portions of equal or unequal length, interconnected so that the maximum distance between then is no more than 0.5 times the flame pinching distance.

The dimension of the passages in the central zone of the reaction member is usually no more than $10^{-2}$ meter (m), advantageously from about $5 \times 10^{-5}$ to about $10^{-3}$ m and preferably from about $10^{-4}$ to about $2 \times 10^{-3}$ m. The dimension of the passages in said second lining of the reaction member is preferably from 5 to 100 times smaller than that of the passages in the first lining thereof.

In an advantageous embodiment the lining of the central zone may comprise, over at least part of the cross-section of the said zone, at least one single member which has a plurality of juxtaposed channels. The axes of the channels are substantially parallel with one another and with the axis of the reactor. In at least one direction the channels have a dimension which is no greater than the pinching distance of the flame which may result from oxidation. The cross-section of the channels may be of any shape, for example polygonal, circular or elliptic, but preferably polygonal, e.g. square, rectangular or hexagonal. The area of the cross-section of the channels is usually from about $25 \times 10^{-10}$ square meters (m²) to about $10^{-4}$ square meters and preferably from about $10^{-8}$ to about $25 \times 10^{-6}$ square meters. All the channels may be identical or different, either in shape or in their cross-sectional area; they are preferably identical.

In another embodiment the lining of the central zone may comprise particulate elements, e.g. in the form of spheres or small rods. It is preferable to use spheres which, when put into contact, provide a maximum space of a length no greater than their radius; this enables the sphere size to be selected according to the desired flame pinching distance.

It is also possible to use a lining comprising at least one single element in the central zone, the single element having a plurality of channels as described above, with particulate elements in at least part of their volume.

In a special embodiment the central reaction zone may have at least one catalyst in at least part of its volume, e.g. a catalyst supported by the walls of the channels of the single member or by the particulate elements. The catalyst will usually be one of those, well known in the art, which encourage e.g. endothermic, "return to equilibrium" reactions. Some non-restrictive examples of such catalysts are those with a carrier, e.g. alumina or silica and, deposited on the carrier, e.g. copper chloride and potassium chloride, vanadium oxide possibly associated with potassium sulphate, cerium, lanthanum or a cerium or lanthanum compound, chromium, a group VIII metal such as nickel and iron, or a compound of chromium or of a group VIII metal such as a compound of nickel or iron, bismuth phosphomolybdate or cobalt molybdate. The catalyst may equally contain metallic oxides such as silver and/or copper oxides and porous silicon carbide covered with silver. In a particularly advantageous embodiment a plurality of catalysts of different compositions may be provided, each being disposed in the reaction zone at the place where its composition is best adapted to encourage e.g. the desired endothermic reaction or reactions.

In a preferred embodiment the material used to form the lining for the central zone is selected from ceramic materials. In this specification the term "ceramic material" refers to all materials which are neither organic nor metallic (the term metallic designating materials formed from elements in the Periodic Table which are defined as metals in the zero oxidation state). In an advantageous embodiment the lining is formed by at least one single element made of hard ceramics which has a plurality of channels and is obtained e.g. by extrusion. Some examples of ceramics which may be employed to form the lining for the central zone are: silicon carbide, alumina, mullite, zirconia, zirconia-mullite, aluminium titanate, boron nitride, silicon nitride, cordierite, oxides of alkaline earth metals, oxides of transition metals and any mixture of these materials. It is preferable to use mullite, alumina, zirconia or zirconia-mullite.

It is particularly advantageous to design the lining of the central zone so that the channels are formed by superposing and possibly juxtaposing a plurality of thin single elements, the distance between each adjacent single element being less than the flame pinching distance and preferably 2 to 5 times less than the dimension of the channels in a plane substantially perpendicular to their axes. When the cross-section of each single element is equal to that of the central reaction zone, a stack of thin unit pieces is thus obtained. If the cross-section of each single element is less than that of the central zone, the unit pieces can be juxtaposed to form a layer with a cross-section equal to that of the central zone, and a series of layers can be superposed to form the channels in said central zone. The thickness of the unit pieces may be e.g. from approximately $5 \times 10^{-3}$ m to 0.5 m and more often from about $10^{-2}$ m to about $5 \times 10^{-2}$ m; the pieces may, for example, have a square cross section with side dimensions from about $1 \times 10^{-2}$ to about 0.5 m and more often from about $3 \times 10^{-2}$ m to about 0.2 m.

This special design of the lining for the central zone, with thin pieces stacked up, implies that induction along the axis of the reactor is less than in the case of a unit piece with the total dimension of the central zone; thus the heat liberated during the oxidation reaction will be transmitted to the mixing zone to a lesser degree. Hence there will be easier control of temperature and thus of the non-starting of the oxidation reaction in the mixing zone. Moreover with this design each unit piece only tolerates a relatively slight temperature gradient, given its small thickness, and there is therefore less danger of fracture. Another advantage of this design is the possibility of depositing a catalyst, e.g. a steam reforming catalyst, on the walls of the same of these pieces, the composition of the catalyst varying from one piece to another. Thus the composition of the catalyst may very easily be adapted according to the location of the piece in the reaction zone, i.e. as a function of the progress of the reactions. The catalyst may be deposited on the walls of the unit pieces by impregnation or any other method well known in the art.

In an advantageous embodiment the second lining, which forms a sleeve surrounding the first lining, is made of ceramic fibres. The sleeve can be obtained by compacting ceramic fibres in situ, that is to say, in the actual reactor, e.g. by applying a pressure or by drawing under vacuum; an excess pressure or depression of about 0.1 MPa is generally sufficient to obtain a sleeve of adequate strength. The sleeve may equally be obtained ex situ in a mould by the same process, then positioned in the reactor. The sleeve is preferably made so that the ratio of its apparent density to the density of the material chosen to make it is from about 0.025:1 to about 0.05:1. In this embodiment the existing passages in the sleeve, formed by interfibre spaces, are directed at random, thus providing an additional zig-zag effect and thus increasing the loss of pressure. The passages usually have characteristics of relative orientation in space and of dimension in at least one direction, such that the oxidation reaction is very greatly decelerated or does not even take place. However, the spaces are large enough for gases to penetrate the tangle formed by the compacted fibres, thus balancing the pressures. The reactor can therefore be used under high pressures, usually from about 1.5 to about 25 MPa, preferably from about 2 to about 20 MPa and most frequently from about 2 to about 10 MPA. The volume of the spaces between fibres in the sleeve of compacted fibres, which may be described as porosity, is usually at least 50% of the volume of the sleeve and may be up to 90% or even 95% of the volume. This porosity preferably consists of pores or spaces with a mean dimension in at least one direction, which is usually less than about $10^{-4}$ m and most frequently less than about $5 \times 10^{-5}$ m, this dimension most frequently being from about $5 \times 10^{-8}$ m to about $5 \times 10^{-5}$ m. The length of the various members making up the reactor is usually from $10^{-2}$ to 20 m. The length of the reaction zone is generally from 50 to 90% of the total length of the reactor, and the mixing zone may e.g. be from 5 to 45% of that length, the rest representing the length occupied by the zone for discharging the products. In the case of a substantially cylindrical reactor, the diameter of the reaction zone and that of the mixing zone will usually be from $5 \times 10^{-2}$ m to 3 m; as for the dimension of the sleeve, its thickness will usually be equal to the diameter of the reaction zone, in the case of a reactor with a reaction zone from $5 \times 10^{-2}$ to $2 \times 10^{-1}$ m, and equal to about half that diameter in the case of a reactor where the reaction zone has a diameter from $2.1 \times 10^{-1}$ to 3 m.

The ceramic fibres used to make the sleeve are obtained by conventional methods from ceramic materials, for example those mentioned above. The preferred materials are the same as those used above for lining the central zone. It is possible, for example, to use the same material for making the channels of the central zone and the sleeve of the peripheral zone, or else different materials.

The fibre used is an insulating material. Hence there is virtually no heat loss, so it is possible to work with the desired oxidising gas/charge to be oxidised ratio, to limit the maximum temperature in the reactor and thus to limit coke formation, to obtain optimum control of the reaction and easily to prevent it from starting in the mixing zone. Consequently, if a powder mixture is used for example, the powder with the most appropriate granulometry can be employed, thus limiting loss of pressure in the mixer.

The heating of the mixing zone by conduction is also limited to conduction just by the pieces made of hard extruded ceramics, since conduction by the fibrous sleeve is negligible. In addition, the extrusions have very thin walls and are individually thin, so this further limits conduction.

One of the great difficulties with this type of reactor is in limiting the space which is not required, in order to avoid any danger of having the reaction failing to be controlled in one zone of the reactor, as mentioned above. The advantage of using a fibre sleeve resides in the shrinkage which the fibre undergoes at high temperature. It may shrink by a few percent, commonly 2 to 5% and the shrinkage will tend to grip the central lining. Since the fibre is partly compressible, this has the effect of eliminating any space between the sleeve and the other parts of the reactor with which the sleeve is in contact. Shrinkage may be brought about by heating the central zone to a high temperature before using the reactor to carry out the oxidation reaction; alternatively it may be brought about while the oxidation reaction is being started up. Since the ceramic fibres used have very low heat conductivity, there is generally more shrinkage near the central zone, where the temperature is very high, than at the periphery of the sleeve. In view of the mechanical properties of the fibre sleeve and the fact that there is more shrinkage near the reaction zone, this avoids any space which is not required between the sleeve and the lining of the central zone on the one hand, and with the wall in contact with the external wall of said sleeve on the other hand (sic).

Another important advantage resides in the thermomechanical properties of the set of ceramic pieces used:
- as far the refractory property of the set of pieces is concerned, the maximum temperature in the reactor, which may be approximately 1400° C., is far below the maximum temperature of use of ceramic materials which are commonly used in this type of application.
- as far as tolerance of the heat gradient is concerned, the fibre sleeve or the few elements of which it is made are formed by a microscopic tangle of unit fibres; hence there is a relatively flexible structure which can tolerate the gradient likely to appear and all the dilations and/or contractions which may result therefrom.

It is preferable to use ceramic materials with a low coefficient of heat conduction and with thin walls to form the central zone of the reaction member. This is in order to limit such conduction as far as possible and to obtain a temperature profile in the reaction member, such that the peak temperature is as far as possible away from the end of the mixer.

A possible way of physically removing the peak temperature from the end of the mixer adjacent the reaction member is to make the gases have a very high linear speed. This enables them to move far enough away from said end of the mixer during the period when the oxidation reactions are being started and the temperature is rising to a peak.

However, another thermokinetic constraint imposed by the oxidation reactions necessitates having a long enough dwell time, most frequently of the order of a few seconds, to allow the thermal or thermocatalytic "return to equilibrium" reactions to take place, and to allow the resultant gas mixture to reach the equilibrium composition as provided for in the thermodynamic calculations.

The reactor as described above at least partly satisfies these two apparently contradictory constraints. In this embodiment, however, the higher the speed of the gases, the longer the reaction member must be. This may lead to very great pressure losses and may also greatly increase the cost of producing the reactor.

In a new first embodiment an improvement of the reactor design described above is proposed, and more particularly an improvement of the design of the reaction member thereof; it satisfies the two above-mentioned constraints better, without leading to pressure losses which are unacceptable or simply too great. In particular it makes it possible to operate with relatively high gas speeds at the outlet of the mixer and thus to take the temperature peak away from the mixing member without greatly increasing the length of the reaction member; it also limits pressure losses as far as possible.

Thus the reaction member (see FIG. 2 below) comprises a first part, towards the mixing member, the central zone of which has a cross-section of an area smaller than that of the cross-section of at least one second part of said central zone, which follows said first part, towards the discharge member. Thus the central zone (4) of said reaction member has a shape such that, in at least part of said central zone, near the mixing member (3), the speed of the gases is higher than in at least one subsequent part of said central zone, located upstream in the direction of displacement of the gases, usually near the member (5) for discharging the products of the reaction.

In a new second embodiment for moving the maximum temperature peak away from the mixing member and limiting it, the central zone of the reaction member comprises s successive parts, s being a positive integer greater than or equal to 2, characterised in that (see FIG. 8) the first part, towards the mixing member, has a lining adapted to define a multiplicity of spaces with passages which have a cross-section of an area S1, said passages having— in at least one direction—a dimension no greater than the pinching distance of the flame which may result from oxidation of said charge, and that the last part, towards the discharge member, has a lining adapted to define a multiplicity of spaces with passages which have a cross-section of an area Ss greater than S1, said passages having—in at least one direction—a dimension no greater than the pinching distance of the flame which may result from oxidation of said charge.

The central zone of the reaction member usually comprises s successive parts, each with a lining adapted to define a multiplicity of spaces with passages of a cross-section which increases in area from one part to the next, from the first part to the last. The number s is preferably a positive integer from 2 to 10 and most frequently from 3 to 6. The areas S1 and Ss are usually such that the ratio Ss:S1 is from about 100:1 to about 4:1, frequently from about 50:1 to about 4:1 and most frequently from about 25:1 to about 10:1. In a common embodiment the central zone of the reaction member comprises three successive parts.

In the most frequent case where the central zone comprises three successive parts, the first part, towards the mixing member, has a lining over a length L1, adapted to define passages of a cross-sectional area S1; the second part, following said first part, has a lining over a length L2, adapted to define passages of a cross-sectional area S2; and the third and last part, towards the discharge member, has a lining over a length L3, adapted to define passages of a cross-sectional area S3. The areas S1, S2 and S3 are such that the ratio S3:S1 is from about 100:1 to about 4:1, and the ratio S2:S1 is from about 50:1 to 1.2:1. The ratio S3:S1 will frequently be from about 50:1 to about 4:1 and more frequently from about 25:1 to about 10:1. The ratio S2:S1 will frequently be from about 25:1 to about 1.5:1 and most frequently from about 10:1 to about 2:1.

It is usually desirable to design the reaction member and particularly the first lining, so that the length L1 of the lining and the area S1 of the cross-section of the passages through the lining are such that, for the oxidation reaction in question, the maximum temperature is reached at a distance at least substantially equal to the length L1 from the mixing member. Most frequently the lengths L1 and L2 and areas S1 and S2 of cross-section of flow of the first two linings will be such that the maximum temperature is reached at a distance substantially between the length L1 and the sum of the lengths L1+L2, away from the mixing member.

The invention also concerns a method of oxidizing an oxidizable charge in gas phase with an oxidizing gas or a mixture of gases including at least one oxidizing gas, wherein the oxidizable charge and the oxidizing gas are fed into a mixing zone defined by the mixing zone the gas mixture from the mixing zone is circulated in a reaction zone comprising a central zone and a peripheral zone, a pressure loss $\Delta P_1$ is set up in the central zone and a pressure loss $\Delta P_2$ in the peripheral zone, the pressure losses being such that substantially all the gas mixture from the mixing zone is reacted in said central zone of said reaction zone, and such that the pressure loss differential $\Delta P_2 - \Delta P_1$ is positive, and the reaction products formed are recovered. The pressure loss differential is preferably within the ranges mentioned above.

A secondary feature of the process is that the gas mixture may be circulated at a speed Vl in at least one first part of the central zone of the reaction zone, towards the mixing zone, and that the gas mixture from said first part may be circulated at a speed Vf below the speed Vl, in at least one other subsequent part of the first part, towards the zone for discharging the products of the reaction.

The speed Vl is usually from about 2 to about 300 $mxs^{-1}$, frequently from about 10 to about 200 $mxs^{-1}$ and most frequently from about 20 to about 150 $mxs^{-1}$. The speed Vf is usually from about 0.05 to about 250 $mxs^{-1}$, frequently from about 0.1 to about 100 $mxs^{-1}$ and most frequently from about 1 to 100 $mxs^{-1}$.

In a common embodiment of the method of the invention, the speed ratio Vl:Vf is usually from about 2:1 to about 50:1, frequently from about 5:1 to about 25:1 and most frequently from about 8:1 to about 20:1.

The method of the invention may be carried out in reactors (FIGS. 6 and 9) where the reaction member has a shape and special features which make it easy to obtain the desired speeds of the mixtures of gases in the various zones of said reaction member. The circulation of the mixture of gases at a speed Vl in at least one first part of the central zone of the reaction zone may be effected by controlling the flow rate and/or pressure of the gases introduced into the mixing member, for a given reaction member; the speed Vf then depending essentially on the respective overall dimensions of the cross-sections of the various parts of the reaction member.

Figure 6:
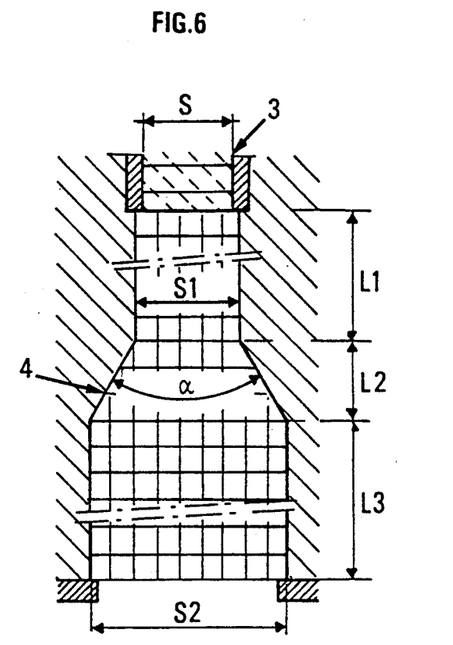
FIG. 6 is an axial section through the lower part of a new first embodiment of the reactor.

Thus in FIG. 6 the overall nozzle shape of the reaction member implies that the speed of the gases in the throat of the nozxle, of length L1, is higher than in the part, of length L3, which follows the diverging piece of length L2 and connects it to the member for discharging the products formed.

Figure 9:
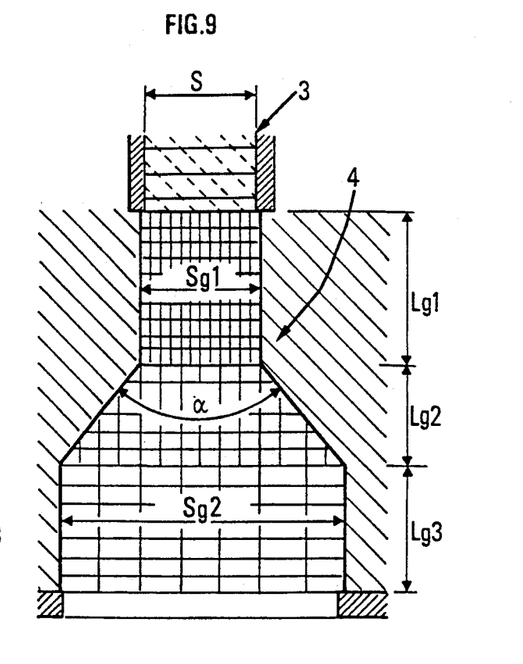

It is the same with FIG. 9, which shows the overall nozzle shape of the reaction member plus the fact that the individual area of the channels is smaller near the mixing member than near the discharge member.

The embodiment illustrated in FIG. 11 and described below comprises a venturi. In this embodiment the charge and the oxidising gas are introduced at a pressure and flow rate such that the speed of the mixture of gases at the level of the venturi throat equals Vl; the mixture of gases then has a speed Vf, lower than the speed Vl, when it leaves the diverging part of the venturi.

The invention also concerns use of the reactor described above for controlled oxidation of an oxidisable charge by a mixture of gases including at least one oxidising gas. The oxidisable charge is, for example, a hydrocarbon charge, particularly a charge of saturated aliphatic hydrocarbons such as methane and effluents from the steam reforming process, o-hydroxylene, naphthalene, benzene, methanol, the methane/toluene mixture and the ethylene/hydrocholoric acid mixture. Air or air enriched with oxygen may, for example, be used as the oxidising gas without any serious disadvantages, and particularly without excessive soot formation. The reactor described above can be used in particular for controlled oxidation of a hydrocarbon charge by a mixture of gases including oxygen, in order to produce a mixture of gases which can be used for synthesising ammonia or synthesising alcohols, including hydrogen and carbon monoxide. In a preferred embodiment of the oxidation process of the invention, the reactive gases are preheated so that the temperature of the mixture of gases at the inlet of the reaction zone is from about 300° C. to 800° C. at the most and most frequently from about 350° C. to about 750° C. The recommended molar ratios of oxidising gas to oxidisable charge and, for example, the molar ratio of oxygen/methane, are usually from 0.5:1 to 0.75:1. The dwell time of the reactive gases in the reaction zone is usually from about 2 milliseconds to about 10 seconds and preferably from about 50 milliseconds to about 1 second. It may be advantageous to prime the oxidation reaction in the reaction zone, preferably in the part adjoining the mixing zone. Priming may, for example, be effected by heating at least part of the reaction zone by any means known in the art, to a temperature of at least 600° C. and preferably from 700° to 1200° C. This heating may take place before the oxidisable charge and oxidising gas are introduced and/or when their introduction is being started. It is neither necessary nor desirable to continue heating after the oxidation reaction has been started; the reaction is exothermic enough to continue without any external heat being applied. Heating may, for example, be carried out by injecting hot gases from a burner, through oxidation of at least one hydrocarbon (e.g. hexane and/or heptane) by a gas containing oxygen or by essentially pure oxygen, the hydrocarbon and the oxygen being introduced into said part of the reaction zone. Priming may equally be effected by other means well known in the art, e.g. with a spark produced, for example, with a sparking plug of the type used for internal combustion engines, or by an electric arc produced e.g. between two electrodes.

BRIEF DESCRIPTION OF THE DRAWINGS

The invention will be understood better from the following description of some embodiments, which are given purely as an illustration and do not limit it in any way. The description refers to the accompanying drawings, in which similar members are designated by the same reference numbers and letters. In the drawings.

DETAILED DESCRIPTION OF THE INVENTION

Figure 1:
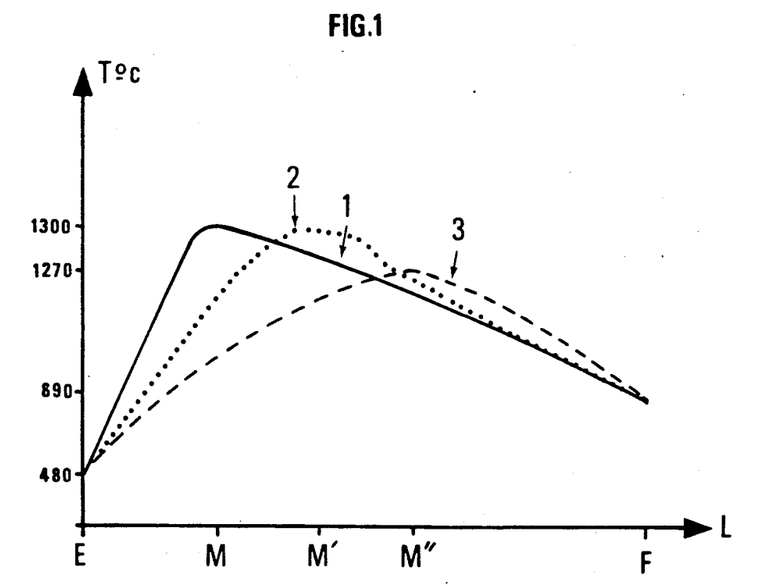
FIG. 1 shows the temperature profile (T°C. on the ordinate), along the axis XX' (on the abscissa) of the reactor, in the reaction zone.
Figure 2:
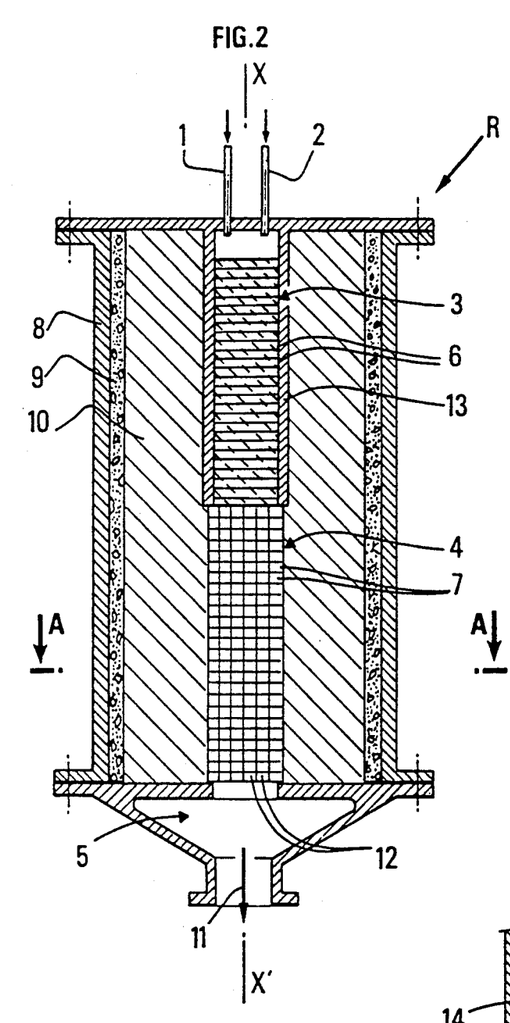
FIG. 2 is an axial section through a reactor according to the invention.

In FIG. 1 the curve 1 represents the temperature profile (T°C. on the ordinate), along the axis XX' (length L on the abcissa) of a reactor, such as that shown diagrammatically in FIG. 2, in the central zone of the reaction member, from the inlet E to the outlet F of said member; the point M corresponds to the maximum or peak temperature. The temperature profile, represented by the curve 1 in FIG. 1, relates to the reaction in which methane is oxidized by air in the presence of steam. The profile has been recorded with 20 thermocouples spaced evenly along the whole length of the reaction member, at intervals of L/20 for a reaction member of length L. In FIG. 1 the curves 2 and 3 respectively represent the temperature profile obtained for the reaction in which methane is oxidized by air in the presence of water, using reactors such as those shown diagrammatically in FIGS. 5 and 9; the points M' and M'' correspond to the temperature maximum. The reactor used to plot the temperature profile shown in curve 2 had a reaction member of the same length as that of the reactor used to plot curve 1, and the experiment was carried out maintaining the same overall dwell time in the reaction member, i.e. maintaining the same reaction volume.

Figure 5:
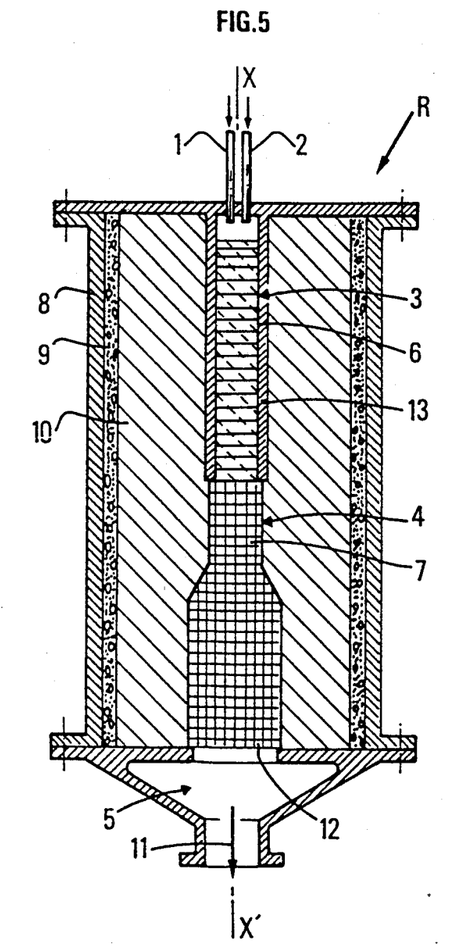
FIG. 5 is an axial section through a new first embodiment of the reactor.

In the case of the reactor shown in FIG. 5, once the location of the temperature peak M has been determined, the time required to reach that peak can be determined by taking into account the flow rate of the gases. If one uses a reactor such as that shown in FIG. 5, having the same reaction volume as that shown in FIG. 2 and having been used to determine the time required to reach the temperature peak, it is then possible to calculate the location of that peak M' in the reactor, as shown diagrammatically in FIG. 5.

The reactor used to plot the temperature profile shown in curve 3 in FIG. 1 had a reaction member such as that shown diagrammatically in FIG. 9. This has a first lining over a length L1 with channels of a cross-sectional area S1, then from the beginning of the divergent part and over a length L2 a second lining with channels of a cross-section area S2 equal to Sm (cross-sectional area of a channel in the reaction member shown in FIG. 2), and finally over a length L a third lining with channels of a cross-sectional area S3. The sum of the lengths L1+L1+L3 is substantially equal to the length Lg of the reaction member, and the areas S1, S2 and S3 are such that S3 is greater than S2, which is itself greater than S1. With a knowledge of the volume Vmax required to reach the peak temperature in the case of a reactor such as that shown in FIG. 2, for a given reaction and a given flow rate, it is easy to predict the zone in which the peak temperature will be reached in the case of a reactor such as that shown e.g. in FIG. 8 or 9, where the dimensions of the various linings and of the cross-sections of flow through them are known. One can in fact be sure that, if the volume Vmax is reached at a distance Lt from the outlet of the mixing member, firstly the peak temperature will be reached at a distance at least equal to Lt—allowing for the fact that the first lining in the reaction zone has unit channels with a cross-sectional area S1 smaller than the area Sm of the channels in the lining of the reaction zone of the reactor shown in FIG. 2, which was used to determine the volume Vmax—and secondly that the kinetics of the oxidation reactions will be slowed down by the smaller dimensions of the passages in the first lining.

The dimensions of the various linings can thus be selected so as to obtain a peak temperature position far enough away from the outlet of the mixing member for there to be no risk of the mixing member being heated through conduction of the heat liberated in the reaction zone.

Figure 3:
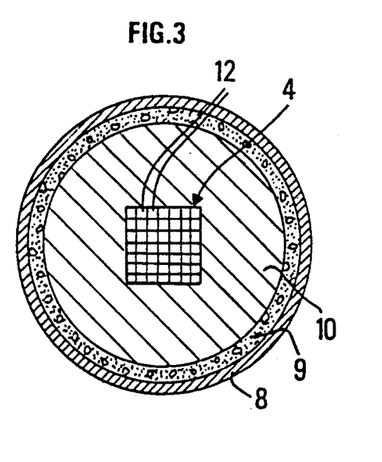
FIG. 3 is a cross-section through the reactor, in the reaction zone, taken along the axis AA' in FIG. 2.

FIGS. 2 and 3 show one embodiment of a vertical, cylindrical reactor R of elongated shape with an axis XX'. It has an external steel wall 8, a sleeve 9 of refractory concrete and a sleeve 10 of ceramic fibre. Substantially at the center of the reactor there is a mixing member 3, comprising a means 1 for feeding the oxidizable charge and a means 2 for feeding the oxidizing gas. The mixing zone is made up of a series of stacked single elements 6 which are thin and made of hard ceramics, with an offset mesh (a maille decalee) and crossed channels. The reactor has a series of thin single elements 7, each containing a plurality of channels of substantially square cross-section. These single elements are superimposed to form a plurality of juxtaposed, substantially parallel channels 12. The channels 12 extend over the whole length of the reaction zone and form the reaction member 4 which follows the mixing member and opens into the member 5 for discharging the products of the reaction through the pipe 11.

Figure 4:
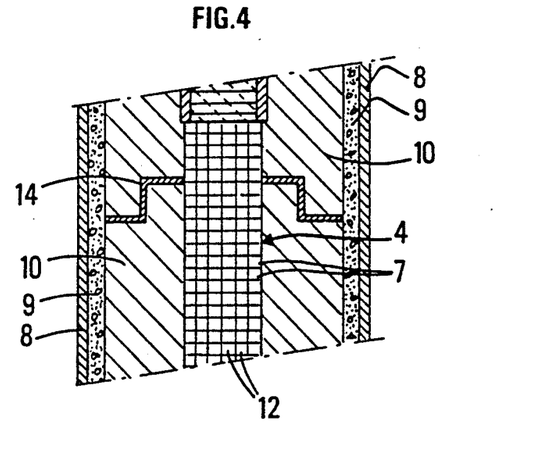
FIG. 4 is an axial section through part of the reaction member, in a case where the sleeve is not made of one piece.

FIG. 4 is an axial section through part of the reaction member, including a sleeve 10 of fibre which is divided into a plurality of pieces and thus formed by a plurality of superposed unit elements. A sleeve in this form may be necessary because of the size of the reactor, or it may be selected because it is easier to produce or position in the reactor. In the case of a sleeve formed by superposing a plurality of unit elements, the distance between each element will preferably be from 2 to 1000 times smaller than the flame pinching distance. It is preferable to design the unit elements forming the sleeve as shown in FIG. 4, so that they form a zig-zagging arrangement, in which jointing material 14 made of ceramic felt may possibly be inserted.

FIG. 5 shows a vertical, cylindrical reactor R of elongated shape, with an axis XX'. It has an external steel wall 8, a sleeve 9 of refractory concrete and as sleeve 10 of ceramic fiber. Substantially at its center. there is a mixing member 3 surrounded by an impervious metal jacket 13. The mixing member has a means 1 for feeding the oxidizable charge and a means 2 for feeding the oxidising gas. The mixing zone is made up of a series of stacked single elements 6, which are thin and made of hard ceramics, with offset meshes and crossed channels. The reactor has a reaction member 4 of an overall nozzle shape. It is formed by superposing a series of thin single elements 7, each containing a plurality of channels of substantially square cross-section. The single elements are superposed to form a plurality of channels 12, which are juxtaposed and substantially parallel. At least some of these channels open into the member 5 for discharging the products of the reaction through the pipe 11. The reactor already has a pressure drop gradient, and the overall nozzle shape of the reaction member gives it the property of also having a gas speed gradient.

The reaction member of the reactor shown diagrammatically in FIG. 5 is shown in greater detail in FIG. 6. It is shaped as a nozzle with any cross-sectional shape, defined by a closed curve such as a circle, an ellipse or a polygon such as a rectangle or square, the area S1 of which is smaller near the mixing member than near the discharging member, where it is equal to S2. In the embodiment shown in FIG. 6 the nozzle has a substantially square cross-section.

In the FIG. 6 embodiment the central zone of the reaction member has the shape of a nozzle near the mixing member. At the level at which it is connected to the mixing member 3 and over a length L1, the nozzle has a cross-sectional area S1 less than or equal to about the area S of the cross-section through the mixing member at the level of said connection. The cross-sectional area increases substantially regularly over a length L2, up to a value S2 equal to about 1.5 to 500 times S1, preferably from 2 to 200 times S1 and most frequently from 5 to 100 times S1. It is then kept substantially constant over a length L3. The sum L of the lengths L1, L2 and L3 is preferably substantially equal to the length of the central zone of the reaction member. If the length L3 were equal to zero this would not be outside the scope of the invention. The length L1 is usually such that, for the oxidation reaction in question, the maximum temperature is reached at a distance from the mixing member at least substantially equal to 0.5 times that length, preferably at least substantially equal to 0.8 times that length and most frequently substantially from 0.8 to 1× that length. The length L2 is usually such that the angle alpha ($\alpha$) of the nozzle is from about 15° to about 120°, the angle is most frequently from about 20° to about 90° and preferably from about 30° to about 60°. The length L3 is preferably selected so that the total dwell time in the reaction member is long enough to reach equilibrium. It is possible to keep the cross-sectional area of the nozzle constant and equal to S2 over a length L4, then gradually to reduce or increase it to a value S3, such that the ratio of the areas S2:S3 is e.g. from about 0.2:1 to about 5:1, this change being carried out over a length L5, and the sum of the lengths L4+L5 usually being equal to the above defined length L3. It is sometimes desirable to obtain gases moving at a relatively high speed at the outlet of the reaction member. In this case the cross-sectional area of the nozzle can be reduced near the member for discharging the products of the reaction, and in this case one may opt then to keep that section constant, e.g. over a length L6 such that the sum of the lengths L4+L5+L6 is equal to the length L3 defined above.

Thus a relatively narrow cross-section of flow may be adopted at the beginning of the reaction zone. The cross-sectional area may, for example, be approximately equivalent to that of the mixing member at the level where it is connected to the reaction member, or equivalent to that of the member (not shown) for ejecting the gases from the mixer. The internal part may then be widened gradually as shown in FIG. 2. In this way the location of the peak temperature in the reactor is taken further away and the danger of heating the mixing member is minimized, thus reducing the risks of its deformation and of deterioration of its constituent materials. The design of the reaction member according to the invention enables the gases introduced into the mixing member to be preheated to a higher level, without any excessive danger to the mixing member, since with this design the temperature peak is relatively far removed from the end of the mixing member. Improved conversion is thus possible and a very adequate safety margin is obtained. The ejection member may be any member selected from those well known in the art. Most frequently it is simply a grill, with a cross-sectional area approximately equivalent to that of the mixing member at the level where it is connected thereto.

Although the invention is not restricted to this feature, the nozzle shape is preferably such that, at the beginning of the reaction zone, its cross-section has a flow area S1 approximately equivalent to the area of the member for ejecting gases from the mixing zone. The purpose of this is to obtain maximum limitation of turbulence at this level.

In an advantageous embodiment the reaction member may have at least one catalyst, for example in at least part of its volume and over at least part of the length L2 and/or over at least part of the length L3. The catalyst may be one which is well known in the art for encouraging endothermic "return to equilibrium" reactions.

Figure 7:
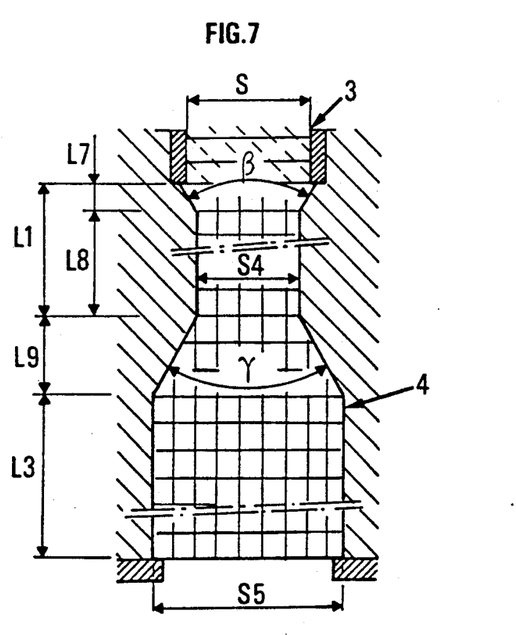
FIG. 7 is an axial section through the lower part of another form of the new first embodiment of the reactor and FIGS. 8, 9, 10 and 11 are axial sections respectively through a first, second, third and fourth form of a second new embodiment of the reactor according to the invention.

In another form of the new first embodiment shown in FIG. 7, the central zone of the reaction member, at least in a first part located near the mixing member, is shaped as a venturi with a convergent and a divergent wall separated by a preferably straight throat. The venturi is formed by superposing a series of thin single elements 7, each having a plurality of channels of substantially square cross-section. The elements 7 are superposed to form a plurality of juxtaposed, substantially parallel channels 12, at least some of which open into the member 5 for discharging the products of the reaction through the pipe 11. Each of these single elements individually has a cross-sectional area which decreases from a size preferably substantially equal to that of the area S of the mixing member at the level where it is connected to the reaction member, to a value S4 which is smaller than S. The reduction in cross-sectional area takes place over a length L7, such that the angle beta ($\beta$) of the convergent wall is preferably from about 30° to 120°. The throat of the venturi preferably has a cross-sectional area which is substantially constant and equal to S4 over a length L8 such that the sum of the lengths L7+L8 is substantially equal to the length L1 defined above. It would not be beyond the scope of the invention to have the length L7 substantially equal to the length L1, with the length L8 then being substantially equal to zero. The divergent wall of the venturi generally has a cross-sectional area S5 at its end, which is larger than that of the throat and preferably at least equal to that of the mixing member at the level where it is connected to the reaction member. The increase in cross-sectional area takes place over a length L9, such that the angle gamma ($\gamma$) of the divergent wall is preferably from about 15° to 120°. The sum of the lengths L1+L9 may be equal to or less than the length L of the reaction member. In cases where the sum of the lengths L1+L9 is less than the length L of the reaction member, the cross-sectional area at the end of the divergent wall of the venturi may be kept substantially constant and equal to S5, over a length L3 such that the sum of the lengths L1+L9+L3 is equal to the length L of the reaction member. It would not be beyond the scope of this embodiment to keep the cross-sectional area S5 at the end of the venturi constant over a length L4, then gradually to reduce or increase it to a value S6, such that the ratio of these areas S5:S6 is e.g. from about 0.2:1 to about 5:1, the change being carried out over a length L5, and the sum of the lengths L4+L5 usually being equal to the length L3 defined above. It is sometimes desirable to obtain gases moving at a relatively high speed at the outlet of the reaction zone. In this case the cross-sectional area of the reaction member may be reduced near the member for discharging the products of the reaction. This is equivalent to forming a second convergent wall opening directly into the discharge member or extending over a length L6 to that member with a substantially constant cross-sectional area, the length L6 usually being such that the sum of the lengths L4+L5+L6 is equal to the length L3 defined above. As in the previous embodiment it is even possible to introduce at least one catalyst, e.g. into at least part of the reaction volume of the reaction member and particularly over at least part of the length L8 and/or at least part of the length L9 and/or L3.

As specified above it is preferable, in the case of both the nozzle and the venturi, for the maximum temperature for the oxidation reaction in question to be reached at a distance from the mixing member substantially at least equal to 0.8 times the length L1 and, most preferably, for the maximum to be reached at a distance substantially from 0.8 to 1 times the length L1. This choice in fact has several advantages:

the peak temperature is generally pushed relatively far back from the mixing zone, particularly if the cross-sectional area of the reaction zone is relatively small and the speed of the gas is therefore relatively high, at the level of the peak temperature the second lining, forming a sleeve 10 made of a refractory, heat insulating material, will thus be relatively thick, thus minimizing heat losses at that level, finally, since the cross-section of flow is narrowed at the peak temperature level, heat storage capacity will be reduced, with the gases taking a maximum of heat to the downstream part of the reactor for the "return to equilibrium" reactions.

Figure 8:
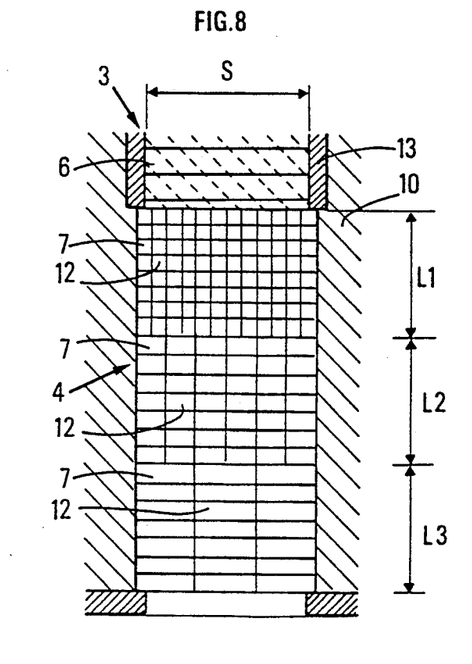

A first form of the second new embodiment of the invention is shown in FIG. 8. A vertical, cylindrical reactor R, of elongated shape with an axis XX' has an external steel wall 8, a sleeve 9 of refractory concrete and a sleeve 10 of ceramic fiber. Substantially at its center the reactor has a mixing member 3 surrounded by an impervious metal jacket 13 and comprising a means 1 for feeding the oxidizable charge and a means 2 for feeding the oxidizing gas. The mixing zone is formed by stacking a series of thin single members 6, made of hard ceramics with offset meshes and crossed channels. The reactor has a reaction member 4, the central zone of which has a substantially constant cross-sectional area and shape over its whole length. In the case shown diagrammatically in the figure, its overall shape is that of a rectangular parallelepiped, and it is formed by superposing three successive linings. Each lining is made up of a series of thin single elements 7, each containing a plurality of channels of substantially square cross-section. The single elements are superposed to form a plurality of juxtaposed, substantially parallel channels 12 in each lining, at least some of the channels opening into the member 5 for discharging the products of the reaction through the pipe 11. The first lining, located at the mixing member side and of a length L1, contains a plurality of channels, each having a cross-sectional area S1. The second lining, following the first one and of a length L2, contains a plurality of channels, each having a cross-sectional area S2 which is greater than S1. The third and last lining, located at the discharge member side and of a length L3, contains a plurality of channels, each having a cross-sectional area S3 greater than S2.

In a second form shown in FIG. 9, there is a vertical, cylindrical reactor R of elongated shape and with an axis XX', which has a reaction member 4 with the overall shape of a nozzle and formed by superposing three successive linings. Each of the linings is made from a series of thin single elements 7, each containing a plurality of channels of substantially square cross-section. The single elements are superposed to form a plurality of juxtaposed, substantially parallel channels 12 in each lining, at least some of the channels opening into the member 5 for discharging the products of the reaction through the pipe 11. The first lining, located at the mixing member side and of a length L1 substantially equal to the length Lg1 of the throat of the nozzle, contains a plurality of channels each with a cross-sectional area S1. The second lining, which follows the first and has a length L2 slightly greater than the length Lg2 of the divergent part of the nozzle, contains a plurality of channels, each with a cross-sectional area S2 greater than S1. The third and last lining, located at the discharge member side and of a length L3, contains a plurality of channels, each with a cross-sectional area S3 greater than S2. The reactor has a pressure drop gradient and gradual control of the kinetics of oxidation, through a gradual increase in the size of the spaces in the reaction member, from the place where the charge enters the central zone of the reaction member 4 to the outlet for the reaction products formed, at the level of the member 5 for discharging said products; and the overall nozzle shape of the reaction member gives the reactor the property of also having a gas speed gradient.

Figure 10:
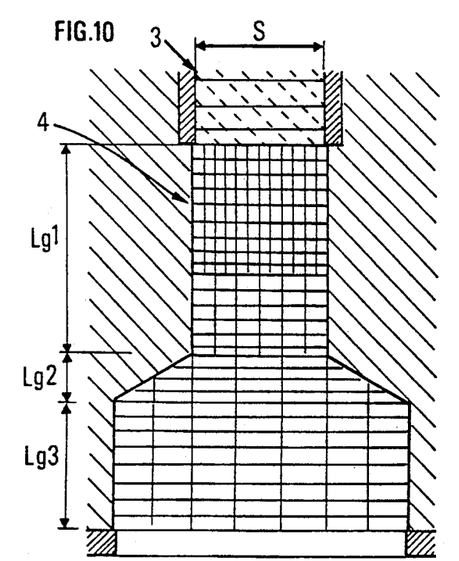

In FIG. 10, showing a third form, there is a vertical, cylindrical reactor R of elongated shape and with an axis SS', comprising a reaction member 4 which has the overall shape of a nozzle and is formed by superposing three successive linings. This embodiment only differs from the FIG. 3 embodiment in the fact that the first lining has a length L1 less than the length of the throat of the nozzle. In this embodiment the sum of the lengths of the first two linings is substantially equal to the length of the throat of the nozzle, and the third lining extends from the beginning of the divergent wall of the nozzle to the level of the member 5 for discharging the products of the reaction.

In the embodiments shown diagrammatically in FIGS. 9 and 10, the central zone of the reaction member has a nozzle shape near the mixing member. The cross-section of the nozzle, at the level where it is connected to the mixing member 3 and over a length Lg1, has an area Sg1 which is less than or approximately equal to the area S of the cross-section of the mixing member at the level of said connection. The cross-sectional area then increases substantially regularly over a length Lg2, to a value Sg2 equal to about 1.5 to 500 times Sg1, preferably from 2 to 200 times Sg1 and most frequently from 5 to 100 times Sg1. It is then kept substantially constant over a length Lg3, the sum Lg of the lengths Lg1, Lg2 and Lg3 preferably being substantially equal to the length of said central zone of the reaction member. It would not be beyond the scope of the invention to have the length Lg3 equal to zero. The first lining of the reaction member usually has a length L1 and a cross-section of passage area S1 such that, for the oxidation reaction in question, the maximum temperature is reached at a distance from the mixing member at least substantially equal to the length 1, regardless of the value of the length Lg1. This maximum is preferably reached at a distance between the values of the length L1 and the sum of the lengths L1+L2. The length Lg2 is usually such that the angle alpha ($\alpha$) of the nozzle is from about 15° to about 120°; this angle is most frequently from about 20° to about 90° and preferably from about 30° to about 60°. The length Lg3 will preferably be selected so that the total dwell time in the reaction member is long enough to reach equilibrium. It is possible to keep the cross-sectional area of the nozzle constant and equal to Sg2 over a length Lg4, then gradually to reduce or increase the section until it has a value Sg3, such that the ratio of the areas Sg2:Sg3 is e.g. from about 0.2:1 to about 5:1, the change being carried out over a length Lg5. The sum of the lengths Lg4+Lg5 is generally equal to the length Lg3 defined above. It is sometimes desirable to obtain gases moving at a relatively high speed at the outlet of the reaction member; in this case the cross-sectional area of the nozzle may be reduced near the member for discharging the products of the reaction, and one can then possible opt to keep that section constant, e.g. over a length Lg6, such that the sum of the lengths Lg4+Lg5+Lg6 is equal to the length Lg3 defined above.

Thus as shown in FIGS. 9 and 10, it is possible to use a reaction member comprising a plurality of successive linings, each having channels of unit section, of an area which increases in the direction of circulation of the charge. A relatively narrow overall cross-section of flow may be adopted at the beginning of the reaction zone. The overall cross-sectional area may e.g. be approximately equivalent to that of the mixing member at the level where it is connected to the reaction member, or equivalent to that of the member (not shown) for ejecting the gases from the mixer. The internal part may then gradually be widened. In this way the location of the peak temperature in the reactor may be moved very considerably, thus minimising the danger of the mixing member being heated and reducing the risks of deformation thereof and deterioration of its constituent materials. The design of the reaction member according to the invention enables the gases introduced into the mixing member to be heated more, without any excessive risk for that member. This is because, with that design, the peak temperature is limited and relatively far away from the end of the mixing member, which enables improved conversion to be obtained while preserving a perfectly adequate safety margin. The ejecting member may be any member selected from those well known in the art. Most frequently it is simply a grid with a cross-sectional area approximately equivalent to that of the mixing member at the level where it is connected thereto.

Although the invention is not restricted to this feature, the shape of the nozzle is preferably such that at the beginning of the reaction zone its cross-section has a flow area Sg1 approximately equivalent to the area of the member for ejecting gases from the mixer, the purpose being to obtain maximum limitation of turbulence at that level.

In an advantageous embodiment the reaction member may comprise at least one catalyst, e.g. in at least part of its volume and over at least part of the length Lg2 and/or at least part of the length Lg3. The catalyst may e.g. be one which is well known in the art for encouraging endothermic "return to equilibrium" reactions.

Figure 11:
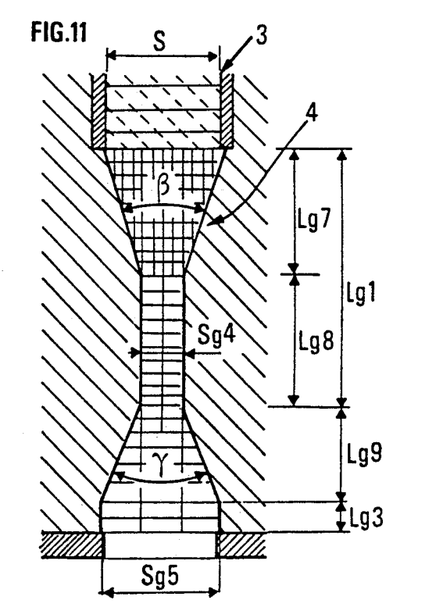

In a fourth form of the second new embodiment of the invention, shown in FIG. 11, the central zone of the reaction member, at least in a first part located near the mixing member, is in the form of a venturi comprising a convergent and a divergent wall separated by a preferably substantially straight throat. The venturi has three linings, each formed by superposing a series of thin single elements 7, each comprising a plurality of channels of substantially square cross-section. The single elements are superposed to form a plurality of juxtaposed, substantially parallel channels 12, at least some of which open into the member 5 for discharging the products of the reaction through the pipe 11. These single elements each individually have an overall cross-sectional area which decreases from an area preferably substantially equal to that of the area S of the mixing member at the level where it is connected to the reaction member, to an area Sg4 smaller than S. The overall cross-sectional area is reduced over a length Lg7 such that the angle beta ($\beta$) of the convergent wall is preferably from about 30° to 120°. The throat of the venturi preferably has an overall cross-sectional area which is substantially constant and equal to Sg4 over a length Lg8, such that the sum of the lengths Lg7+Lg8 is substantially equal to the length Lg1 defined above. It would not be beyond the scope of the invention to have the length Lg7 substantially equal to the length Lg1 and the length Lg8 substantially equal to zero. The divergent part of the venturi usually has an overall cross-sectional area Sg5 at the end, greater than the area of the throat and preferably at least equal to that of the mixing member at the level where it is connected to the reaction member. The overall cross-sectional area is increased over a length Lg9, such that the angle gamma ($\gamma$) of the divergent wall is preferably from about 15° to 120°. The sum of the lengths Lg1+Lg9 may be equal to or less than the length Lg of the reaction member. In cases where the sum of the lengths Lg1+Lg9 is less than the length Lg of the reaction member, the overall cross-sectional area at the end of the divergent wall of the venturi may be kept substantially constant and equal to Sg5 over a length Lg3, such that the sum of the lengths Lg1+Lg9+Lg3 is equal to the length Lg of the reaction member. It would not be beyond the scope of this other embodiment to keep the value Sg5 of the overall cross-sectional area at the end of the venturi constant over a length Lg4, then gradually to decrease or increase it to a value Sg6, such that the ratio of the areas Sg5:Sg6 is e.g. from 0.2:1 to about 5:1, the change being carried out over a length Lg5. The sum of the lengths Lg4+Lg5 is usually equal to the length Lg3 defined above. It is sometimes desirable to obtain gases moving at a relatively high speed at the outlet of the reaction member. In this case the overall cross-sectional area of the reaction member may be reduced near the member for discharging the products of the reaction. This is equivalent to forming a second convergent wall opening directly into the member for discharging the products of the reaction, or continuing with a substantially constant overall cross-sectional area over a length Lg6, to the discharge member, the length Lg6 usually being such that the sum of the lengths Lg4+Lg5+Lg6 is equal to the length Lg3 defined above. As in the previous embodiment it is even possible to include at least one catalyst, e.g. in at least part of the reaction volume of the central zone of the reaction member, and particularly over at least part of the length Lg8 and/or at least part of the length Lg9 and/or Lg3.

In the various embodiments of the invention, the reaction member has a cross-section of any shape, defined by a closed curve e.g. a circle, an ellipse or a polygon such as a rectangle or square. In cases where the reaction member is shaped as a nozzle, this has an overall cross sectional area Sg1, which is smaller near the mixing member than near the discharge member, where it is equal to Sg2. In the embodiments shown diagrammatically in FIGS. 9 and 10, the nozzle has a substantially square cross-section.

As specified above, the temperature peak is generally reached in the zone containing the second lining, in the case of both the nozzle and the venturi. In the case of the nozzle, for example, one can thus distinguish between two embodiments: in the first the part of smallest cross-section of the nozzle has one or more linings over its whole length, the linings having dimensions, cross-section of flow areas and lengths such that the temperature maximum for the oxidation reaction in question is reached in said part. In the second embodiment the part of the nozzle with the smallest cross-section has one or more linings over its whole length, the linings having dimensions, cross-section of flow areas and lengths such that the temperature maximum for the oxidation reaction in question is reached in one of the parts following the said part, and is thus not reached in said part.

In the case of the venturi, this preferably has one or more linings over its whole length, the linings having dimensions, cross-sectional flow areas and lengths such that the maximum temperature for the oxidation reaction in question is reached at a point located after the centre of the throat, in the circulating direction of the charge being reacted, and preferably at a point located at a distance of over 0.8 times the length of the throat from the beginning thereof, in the circulating direction of the charge.

Thus in the case of both the venturi and the nozzle, the central zone 4 of the reaction member has a form such that, in at least part of said central zone, located near the mixing member 3, the speed of the gases is higher than in at least one subsequent part of said central zone, located upstream of the discharge member 5 in the direction of displacement of the gases.

Thus in the case of both the nozzle and the venturi it may be advantageous, according to the length and cross-section of flow area of the first two linings, for the maximum temperature for the oxidation reaction in question to be reached at a distance from the mixing member substantially at least equal to 0.8 times the length Lg1. This choice in fact has several advantages:
  the peak temperature is generally pushed back relatively far from the mixer, particularly if the overall cross-sectional area of the reaction zone is relatively small and the speed of the gas is therefore relatively high,
  at the level of the peak temperature the second lining forming a sleeve 10, made of a refractory, heat insulating material, will thus be relatively thick, thus minimising heat losses at that level, finally, since the cross-section of flow is narrowed at the level of the peak temperature, heat capacity will be reduced and the gases will take a maximum of heat to the downstream part of the reactor for the "return to equilibrium" reactions.

All in all the use of the reactor according to the invention is particularly advantageous. Thus in the reactor according to the invention when one passes from the mixing zone to the reaction zone, from the point of view of the kinetics of the oxidation reactions one is passing from a situation where the progress of the oxidation reactions is virtually completely blocked (particularly in the case of powder mixers, since the powder of controlled granulometry has this specific function) to a situation of controlled progress of the reactions. With the presence of even fine channels at the beginning of the reaction member, it is thus possible firstly to limit the pressure drop of the whole unit. Secondly, from a kinetic point of view, the oxidation reactions are limited or even totally controlled by wall effects, which is much less the case with thermal steam reforming type "return to equilibrium" reactions. Clearly exothermic oxidation reactions can be partially limited by greatly multiplying the wall effects, since the mean size of the channels is smaller, and more time can simultaneously be left for endothermic "return to equilibrium" reactions. Thus in terms of free space one is passing from a situation where the mean size of the spaces (in terms of the mean cross-section of flow area) is usually of the order of a few tens of square microns, to a situation where the mean size of the spaces is of the order of a few square millimetres. Thus the reactor of the invention makes it possible to control the kinetics of oxidation reactions in the reaction zone, by having spaces of relatively small dimensions at the beginning of the zone, and by increasing the dimensions of the spaces all the way along it. Such an embodiment makes it possible to obtain what can be described as "gradual loosening up" of the kinetics of oxidation reactions. The size of the various passages in the central zone of the reaction member will usually still be less than about $10^{-2}$ meter (m). This dimension is most frequently from about $5 \times 10^{-5}$ to about $2 \times 10^{-3}$ m and preferably from about $10^{-4}$ to about $10^{-3}$ m. In terms of cross-sectional area, these spaces will thus usually have an area from about 0.0025 to about 100 mm$^2$ and most frequently from about 0.01 to about 4 mm$^2$.

As a means of moving the temperature peak as far as possible away from the mixer, it is also quite possible to build up the "gradual loosening up" action with a speed effect, by using a reaction member with a central zone in the overall shape of a nozzle or venturi.

The following examples are given to illustrate the invention but they do not restrict its scope.

EXAMPLE 1

A vertical reactor R of tubular shape is set up as shown in FIG. 2, comprising an external metal, pressure resistant jacket 8, two inlets 1 and 2 for the gases and an outlet 11 for the effluents.

A gas mixer is placed inside said jacket and substantially at its centre. The mixer is itself surrounded by a cylindrical, impervious metal jacket 13 which is $10^{-1}$ m high and $4 \times 10^{-2}$ m in diameter (this unit forming the mixing zone 3). The mixer is formed by discs 6 stacked one above the other and comprising crossed channels of the SULZER type; these discs and the space above them are filled with alumina powder of a granulometry from $5 \times 10^{-5}$ m to $10^{-4}$ m (50 to 100 microns).

In the mixing zone at its upper end, two pipes bring in the two fluids (methane plus steam at one side through the pipe 1, air at the other through the pipe 2).

The cylindrical jacket surrounding the mixer is terminated by a hopper holding the alumina powder, which is placed on a grid (not shown in FIG. 2). The grid has 14 holes $4 \times 10^{-5}$ m in diameter, arranged inside a central square with a side dimension of $10^{-2}$ m.

The gases leaving the mixer pass through the central grid into the reaction part 4, which comprises the stack of 50 square unit pieces made of zirconia mullite. Each unit piece has a thickness of $10^{-2}$ m and a side dimension of $4 \times 10^{-2}$ m and contains 841 square holes with a side dimension of $10^{-3}$ m. This grid acts as the member for ejecting the gases from the mixing member into the single element reaction member.

The metal jacket 13 surrounding the mixer and the pieces 7 of the reaction part 4 are gripped in a sleeve of alumina fibre with an outside diameter of $14 \times 10^{-2}$ m. The fibre sleeve 10 is surrounded by a sleeve 9 of refractory concrete, which establishes the connection with the metal wall 8 forming the external jacket of the reactor R. The alumina fibres used to make the sleeve have a mean diameter of $3 \times 10^{-6}$ m and a mean length of $150 \times 10^{-6}$ m. The apparent density of the sleeve, measured after the reactor has operated for 10 hours, is 0.3 and the mean dimension of the interfibre spaces is $6 \times 10^{-6}$ m.

With the reactor as described above and operating at 4 MPa, methane and steam are fed in through the line 1 and air through the line 2, in proportions such that the mixture of gases has the following molar composition:

The temperature of the mixture of gases at the inlet of the mixing zone is 400° C. At the outlet 11 of the reactor a gas is recovered at a temperature of 855° C. Its molar composition, after condensation of the water, is as follows:

Thermal conditions stabilised after 5 hours of operation, and the reaction was carried out for 300 hours without any problem. A pressure drop differential, measured after 5 hours of operation, is 0.1 MPa. During this operation the temperature of the metal wall of the reactor, measured on its outside surface, did not exceed 150° C. When the test had been stopped and the various components of the reactor dismantled, no cracks were found in the concrete layer and no deterioration either of the fibrous sleeve or of the various ceramic pieces. The coke content was measured during the test and found to be about 10 mg of coke per cubic meter of gas (returned to normal temperature and pressure) at the outlet 11 of the reactor.

EXAMPLE 2

The reactor is the same as in Example 1, except that the gases leaving the mixing member pass through the central grid in the reaction part 4 (FIG. 5), which consists of the stack of 50 square unit pieces of zirconia mullite, of variable cross-section but the same thickness, namely $10^{-2}$ m. One first finds a stack of 12 pieces with a side dimension of $10^{-2}$ m, containing 49 square holes with a side dimension of $10^{-3}$ m, then 10 pieces of variable cross-section ranging from a side dimension of 1.2 to $4.8 \times 10^{-2}$ m, with a pitch of $0.4 \times 10^{-2}$ m, then 28 pieces with a side dimension of $5 \times 10^{-2}$ m, containing 1296 square holes with a side dimension of $10^{-3}$ m.

The composition of the gas introduced is the same as in Example 1. The temperature of the mixture of gases at the inlet of the mixing member is 450° C. At the outlet 11 of the reactor a gas is recovered at a temperature of 870° C. Its molar composition, after condensation of the water, is as follows:

$CH_4 = 19$
$N_2 = 1130$
$O_2 = 0$
$H_2 = 894$
$CO = 248$
$CO_2 = 182$

After 5 hours of operation thermal conditions stabilised, and the reaction was carried out for 450 hours without any problem. The pressure drop differential, measured after 5 hours of operation, is 0.1 MPa. During this operation the temperature of the metal wall of the reactor, measured on its external surface, did not exceed 150° C. When the test had been stopped and the various components of the reactor dismantled, no cracks were found in the concrete layer and no deterioration either of the fibrous sleeve or of the various ceramic parts. The coke content was measured during the test and found to be about 8 mg of coke per cubic meter of gas (returned to normal temperature and pressure) at the outlet 11 of the reactor. These results show that it is possible to work with gases at a higher inlet temperature, without any major problem, and to obtain better conversion with a reduction in coke formation, as compared with the conversion obtained with the reactor in Example 1.

EXAMPLE 3

The reactor is the same as in Example 2, except that the gases leaving the mixing member pass through the grid into the reaction part 4 (FIG. 9) which is made up of the stack of 50 square unit pieces of zirconia mullite with an overall cross-section of variable area but with the same thickness, namely $10^{-2}$ m. One first finds a stack of 12 pieces with a side dimension of $10^{-2}$ m, containing 100 square holes with a side dimension of $0.25 \times 10^{-3}$ m, then 10 pieces of variable overall dimensions ranging from a side dimension of 1.2 to $4.8 \times 0^{-2}$ m, with a pitch of $0.4 \times 10^{-2}$ m, containing a number of holes increasing proportionally with the overall dimensions, the holes having a side dimension of $0.5 \times 10^{-3}$ m, then 28 pieces with a side dimension of $5 \times 10^{-2}$ m containing 1296 square holes with a side dimension of $10^{-3}$ m.

The composition of the gas introduced is the same as in Example 1. The total flow rate of the gases as they enter the reactor is 4.1 $m^3 \times h^{-1}$ (cubic meters per hour). Under these conditions the speed of the gas, as calculated (taking into account the flow rate and the total area of flow) at the level where the gases enter the central zone of the reaction member, is 23.3 $mxs^{-1}$ (meters per second), and the gases have substantially the same speed at the end of the throat of the nozzle. The speed of the gases, calculated at the level of the outlet from the central zone of the reaction member, is 1.4 $mxs^{-1}$.

The temperature of the mixture of gases at the inlet of the mixing member is 480° C. At the outlet 11 of the reactor a gas is recovered at a temperature of 890° C. Its molar composition, after condensation of the water, is as follows:

$CH_4 = 15$
$N_2 = 1130$
$O_2 = 0$
$H_2 = 903$
$CO = 256$
$CO_2 = 179$

After 5 hours of operation thermal conditions have stabilised, and the reaction is carried out for 600 hours without any problem. The pressure drop differential, measured after 5 hours of operation, is 0.1 MPa. During this operation the temperature of the metal wall of the reactor, measured on its external surface, did not exceed 150° C. When the test had been stopped and the various components of the reactor dismantled, no cracks were found in the concrete layer and no deterioration in either the fibrous sleeve or the various ceramic parts. The coke content was measured during the test and found to be approximately 8 mg of coke per cubic meter of gas (returned to normal temperature and pressure) at the outlet 11 of the reactor. These results show that it is possible to work with gases at a higher inlet temperature, without any major problem, and to obtain better conversion with a reduction in coke formation, as compared with the conversion obtained with the reactor in Example 1.

We claim:

1. An oxidation reactor of elongated shape comprising in combination:
    at least one mixing member comprising means for feeding oxidizing gas and means for feeding oxidizable charge,
    at least one reaction member, following said mixing member and located at a distance therefrom which is no greater than a flame pinching distance wherein a flame which may result from reaction of the oxidizable charge and the oxidizing gas is stopped, and
    at least one member for discharging the products of the reaction, connected to said reaction member; said reaction member comprising a central zone, which over at least part of its cross-section has at least one first lining, adapted to define a multiplicity of spaces providing passages which, in at least one direction, have a dimension no greater than the flame pinching distance, and at least one peripheral zone adjacent to said central zone which, over at least part of its cross-section, has at least one second lining, adapted to define a multiplicity of spaces providing passages which, in at least one direction, have a dimension smaller than that of the passages in the central zone, so that a pressure loss in the second lining is greater than that in the first lining, said second lining forming a sleeve surrounding said first lining.

2. The reactor of claim 1, wherein the dimension of the passages in the peripheral zone is from 2 to 1000 times smaller than that of the passages in the central zone.

3. The reactor of claim 2, wherein said reactor has a longitudinal axis and the first lining of the central zone has at least one single element over at least part of its cross-section, the single element having a plurality of juxtaposed channels with axes which are substantially parallel with one another and with the axis of the reactor, and with a dimension in at least one direction no greater than the pinching distance of the flame which may result from oxidation of said charge.

4. The reactor of claim 1, wherein said second lining forming a sleeve is made of ceramic fibres.

5. The reactor of claim 3, wherein the single element is made of hard ceramic material over at least part of its cross-section.

6. The reactor of claim 3, wherein the lining of the central zone is formed by superposing and juxtaposing a plurality of single elements, the distance between each adjacent single element being less than the flame pinching distance, both in a vertical direction and a horizontal plane.

7. The reactor of claim 3, wherein the central zone has a catalyst in at least part of its volume.

8. The reactor of claim 7, wherein the catalyst is supported by walls forming the plurality of juxtaposed channels of the single element.

9. The reactor of claim 1, wherein the sleeve surrounding the first lining extends over the whole length of the reaction member.

10. The reactor of claim 1, wherein the sleeve surrounding the first lining extends over the whole length of the reaction member and the mixing member.

11. The reactor of claim 1, wherein the sleeve surrounding the first lining is divided into at least two portions of equal or unequal length, interconnected so that the maximum distance between the at least two portions is no greater than 0.5 times the flame pinching distance.

12. The reactor of claim 1, wherein the reaction member has a first part adjacent the mixing member, the central zone of which has a cross-sectional area smaller than the cross-sectional area of at least one second part of the central zone, following the first part, adjacent the discharge member.

13. The reactor of claim 12, wherein the central zone of the reaction member comprises a nozzle, the cross-sectional area of the nozzle being smaller adjacent the mixing member than adjacent the discharge member.

14. The reactor of claim 12, wherein the central zone of the reaction member comprises a nozzle adjacent the mixing member, that the cross-section of the nozzle, where it is connected to the mixing member 3 and over a length L1, has an area S1 smaller than or about equal to an area S of the cross-section of the mixing member of said connection, that the cross-sectional area then increases substantially evenly over a length L2, to a value S2 equal to about 1.5 to 500 times S1, and that it is then kept substantially constant over a length L3, the sum L of the lengths L1, L2 and L3 being substantially equal to the length of the central zone.

15. The reactor of claim 14, wherein the length L1 is such that the maximum temperature for the oxidation reaction is reached at a distance from the mixing member at least substantially equal to 0.5 times the length L1, and that the length L2 is such that the angle alpha of the nozzle is from about 15° to about 120°.

16. The reactor of claim 14, wherein the length L1 is such that the maximum temperature for the oxidation reaction is reached at a distance from the mixing member substantially from 0.8 times to 1 times the value of the length L1.

17. The reactor of claim 12, wherein the central zone of the reaction member comprises a venturi adjacent the mixing chamber, the venturi comprising a convergent part and a divergent part separated by a throat and having a section, at its connection to the mixing member, of an area substantially equal to that of said mixing member at said connection; a section at the level of the throat having an area less than that of the mixing member at the level of its connection with said venturi; and a section at the end of the divergent part having an area greater than that of said throat.

18. The reactor of claim 17, wherein the venturi has a length L1 from its connection to the mixing member to the end of the throat connected to the divergent part, the length L1 being such that the maximum temperature for the oxidation reaction is reached at a distance from the mixing member at least substantially equal to 0.5 times the value of the length L1, wherein an angle beta of the convergent part is from about 30° to about 120°, and wherein an angle gamma of the divergent part is from about 15° to about 120°.

19. The oxidation reactor of claim 1, wherein the central zone of the reaction member comprises s successive parts comprising a first part near the mixing member, said first part having a lining adapted to define a multiplicity of spaces with passages which have a cross-section of an area S1, said passages having, in at least one direction, a dimension no greater than the pinching distance of the flame which may result from oxidation of said charge, and a last part adjacent the discharge member, said last part having a lining adapted to define a multiplicity of spaces with passages which have a cross-section of an area Ss greater than S1, said passages of the last part having, in at least one direction, a dimension no greater than the pinching distance of the flame which may result from oxidation of said charge, s being a positive integer greater than or equal to 2.

20. The reactor of claim 19, wherein the central zone of the reaction member comprises s successive parts, each having a lining adapted to define a multiplicity of spaces providing passages, of increasing cross-sectional area which increases from the first part to the last part.

21. The reactor of claim 19 or 20, wherein the central zone of the reaction member has three successive parts.

22. The reactor of claim 21, wherein the first part, adjacent the mixing member, has a lining over a length L1, having passages of a cross-sectional area S1, wherein the second part, following the first part, has a lining over a length L2 having passages of a cross-sectional area S2, and wherein the third part, adjacent the discharge member, has a lining over a length L3 having passages of a cross-sectional area S3, the areas S1, S2 and S3 being such that the ratio S3:S1 is from 100:1 to about 4:1, and the ratio S2:S1 is from about 50:1 to about 1.2:1.

23. The reactor of claim 22, wherein the length L1 and the area S1 are such that the maximum temperature for the oxidation reaction is reached at a distance from the mixing member at least substantially equal to the length L1.

24. The reactor of claim 22, wherein the lengths L1 and L2 and the areas S1 and S2 are such that the maximum temperature of the oxidation reaction is reached at a distance from the mixing member substantially from the value of the length L1 to the value of the sum of lengths L1+L2.

25. The reactor of claim 24, wherein the central zone of the reaction member has an overall cross-section of substantially constant area and shape over its whole length.

26. The reactor of claim 24, wherein the central zone of the reaction member comprises a nozzle, an area of an overall cross-section of the nozzle being smaller adjacent the mixing member than adjacent the discharge member.

27. The reactor of claim 26, wherein a part of the overall cross-section of the nozzle with a smallest area has one or more linings over its whole length, the lining having area dimension, cross-section of flow and length characteristics such that the maximum temperature for the oxidation reaction is reached in said part with the smallest area.

28. The reactor of claim 26, wherein a part of the overall cross-section of the nozzle with a smallest area has one or more linings over its whole length, the linings having area dimension, cross-section of flow and length characteristics such that the maximum temperature for the oxidation reaction is reached in one of the parts following said part with the smallest area.

29. The reactor of claim 19, wherein the central zone of the reaction member, adjacent the mixing member, is in the form of a venturi comprising a convergent and a divergent part separated by a throat, and wherein the venturi, at the level where it is connected to the mixing member, has an overall cross-section of an area substantially equal to that of said member at the level of said connection; an overall cross-section at the level of the throat of an area substantially less than that of the mixing member at the level of its connection to the venturi; and an overall cross-section at the end of the divergent part of an area larger than that of said throat.

30. The reactor of claim 29, wherein the venturi has one or more linings over its whole length, with dimension, cross-section of flow area and length characteristics such that the maximum temperature for the oxidation reaction is reached at a point located after a center of the throat, in a direction in which reactants flow.

* * * * *